US011393209B2

(12) United States Patent
Vijayanarasimhan et al.

(10) Patent No.: US 11,393,209 B2
(45) Date of Patent: Jul. 19, 2022

(54) GENERATING A VIDEO SEGMENT OF AN ACTION FROM A VIDEO

(71) Applicant: Google LLC, Mountain View, CA (US)

(72) Inventors: Sudheendra Vijayanarasimhan, Pasadena, CA (US); Alexis Bienvenu, Mountain View, CA (US); David Ross, San Jose, CA (US); Timothy Novikoff, Mountain View, CA (US); Arvind Balasubramanian, Fremont, CA (US)

(73) Assignee: Google LLC, Mountain View, CA (US)

(*) Notice: Subject to any disclaimer, the term of this patent is extended or adjusted under 35 U.S.C. 154(b) by 175 days.

(21) Appl. No.: 16/985,342

(22) Filed: Aug. 5, 2020

(65) Prior Publication Data

US 2020/0364464 A1   Nov. 19, 2020

Related U.S. Application Data

(63) Continuation of application No. 15/782,789, filed on Oct. 12, 2017, now Pat. No. 10,740,620.

(51) Int. Cl.
*G06V 20/40* (2022.01)
*G06F 3/0484* (2022.01)
*G06N 3/04* (2006.01)
*G06V 20/30* (2022.01)

(52) U.S. Cl.
CPC .......... *G06V 20/47* (2022.01); *G06F 3/0484* (2013.01); *G06N 3/04* (2013.01); *G06V 20/30* (2022.01); *G06V 20/41* (2022.01); *G06V 20/44* (2022.01)

(58) Field of Classification Search
CPC ........ G06V 20/44; G06V 20/30; G06V 20/41; G06V 20/47; G06N 3/04; G06F 3/0484
See application file for complete search history.

(56) References Cited

U.S. PATENT DOCUMENTS

| 8,195,038 | B2* | 6/2012 | Liu ....................... G06F 16/739 |
| | | | 386/344 |
| 9,082,092 | B1 | 7/2015 | Henry |
| 9,300,722 | B2 | 3/2016 | Paley et al. |
| 9,473,748 | B2 | 10/2016 | Elangovan et al. |
| 9,544,619 | B2 | 1/2017 | Kim et al. |
| 9,639,758 | B2 | 5/2017 | Hwang et al. |

(Continued)

OTHER PUBLICATIONS

USPTO, First Action Interview, Pre-Interview Communication for U.S. Appl. No. 15/782,789, dated Jun. 10, 2019, 5 pages.

(Continued)

*Primary Examiner* — Mia M Thomas
(74) *Attorney, Agent, or Firm* — IP Spring

(57) ABSTRACT

A computer-implemented method includes receiving a video that includes multiple frames. The method further includes identifying a start time and an end time of each action in the video based on application of one or more of an audio classifier, an RGB classifier, and a motion classifier. The method further includes identifying video segments from the video that include frames between the start time and the end time for each action in the video. The method further includes generating a confidence score for each of the video segments based on a probability that a corresponding action corresponds to one or more of a set of predetermined actions. The method further includes selecting a subset of the video segments based on the confidence score for each of the video segments.

20 Claims, 8 Drawing Sheets

(56) References Cited

U.S. PATENT DOCUMENTS

| | | |
|---|---|---|
| 9,841,879 B1 | 12/2017 | Gray et al. |
| 9,858,297 B2 | 1/2018 | Park et al. |
| 9,883,244 B2 | 1/2018 | Zajac |
| 9,959,903 B2 | 5/2018 | Chen |
| 10,074,015 B1 | 9/2018 | Grundmann et al. |
| 10,318,813 B1* | 6/2019 | Pereira .................. G06V 20/635 |
| 10,582,149 B1* | 3/2020 | Mysore Vijaya Kumar ................ H04N 7/0127 |
| 11,209,442 B2* | 12/2021 | Winn ..................... C07K 16/28 |
| 2010/0235857 A1 | 9/2010 | Lestage et al. |
| 2011/0167337 A1 | 7/2011 | Paley et al. |
| 2013/0156321 A1* | 6/2013 | Motoi .................... G06V 20/47 382/190 |
| 2014/0089804 A1 | 3/2014 | Gazit et al. |
| 2014/0245463 A1 | 8/2014 | Suryanarayanan et al. |
| 2014/0267801 A1* | 9/2014 | Grundmann ....... H04N 5/23267 348/208.1 |
| 2015/0324636 A1 | 11/2015 | Bentley et al. |
| 2016/0012296 A1 | 1/2016 | Xing et al. |
| 2016/0034763 A1* | 2/2016 | Takanaka ................ G11B 27/28 386/241 |
| 2016/0133297 A1 | 5/2016 | Thornton et al. |
| 2016/0343402 A1* | 11/2016 | Singhal ................ G11B 27/031 |
| 2017/0109584 A1 | 4/2017 | Yao et al. |
| 2018/0122197 A1 | 5/2018 | Wu |
| 2018/0146212 A1* | 5/2018 | Hensler ................ H04N 13/139 |
| 2018/0232051 A1 | 8/2018 | Wu et al. |
| 2019/0073520 A1* | 3/2019 | Ayyar .................. G06V 40/162 |
| 2019/0114487 A1* | 4/2019 | Vijayanarasimhan ........................ G06V 20/47 |
| 2019/0188479 A1* | 6/2019 | Balasubramanian .. G06V 20/46 |
| 2020/0134813 A1* | 4/2020 | Palmer .................. G06V 10/30 |

OTHER PUBLICATIONS

USPTO, Notice of Allowance for U.S. Appl. No. 15/782,789, dated Mar. 27, 2020, 11 pages.

USPTO, First Action Interview, Office Action Summary for U.S. Appl. No. 15/782,789, dated Oct. 18, 2019, 6 pages.

* cited by examiner

GENERATING A VIDEO SEGMENT OF AN ACTION FROM A VIDEO

CROSS-REFERENCE TO RELATED APPLICATIONS

The present application is a continuation of U.S. patent application Ser. No. 15/782,789, filed Oct. 12, 2017 and titled GENERATING A VIDEO SEGMENT OF AN ACTION FROM A VIDEO, the contents of which are incorporated herein by reference in their entirety.

BACKGROUND

Users often capture many videos on their camera devices. Even though the videos were of interest to the user at the time of capture, the videos may be forgotten about and not watched again because users may not have the patience to watch even a minute-long video to wait for the interesting parts of the video. This may be even more true when the video is longer, such as an hour-long sports event or a 30-minute live video.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations generally relate to a system that includes one or more processors and a memory with instructions stored thereon that, when executed by the one or more processors, cause the one or more processors to perform operations. The operations include receiving a video that includes multiple frames. The operations further include identifying a start time and an end time of each action in the video based on application of one or more of an audio classifier, an RGB classifier, and a motion classifier. The operations further include identifying video segments from the video that include frames between the start time and the end time for each action in the video. The operations further include generating a confidence score for each of the video segments based on a probability that a corresponding action corresponds to one or more of a set of predetermined actions. The operations further include selecting a subset of the video segments based on the confidence score for each of the video segments.

In some implementations, the operations further include generating a video clip from the subset of the video segments, wherein the video clip is displayed in association with the video and generating graphical data to display a user interface that includes an option to add an automated effect to the video clip. In some implementations, wherein the set of predetermined actions is associated with a live video and the operations further include generating a video clip that includes the subset of the video segments, wherein the video clip is a summary of the actions that occurred during the live video. In some implementations, the operations further include generating graphical data to display a user interface that identifies a time within the video that corresponds to the video segment and a type of action that is performed within the video segment. In some implementations, the operations further include identifying a first person and a second person in one or more of the video segments, wherein the subset of the video segments is further based on the one or more of the video segments that include the first person, generating a first video clip that includes the subset of the video segments, and providing the first video clip to the user as a personalized video clip that includes the first person and an option to generate a second video clip that includes the second user. In some implementations, the operations further include identifying a type of action for each action in the video, determining that there are more than one actions in the video for a particular type of action, and in response to determining that there are more than one actions in the video, selecting a particular video segment of the video segments that correspond to the more than one action, wherein the particular video segment is selected based on the confidence score for the video segment being greater than confidence scores for other video segments that correspond to the more than one actions. In some implementations, the operations further include generating a machine learning model based on a set of videos where users identified corresponding start times and end times for actions within each video in the set of videos and generating one or more of the RGB classifier, the audio classifier, and the motion classifier based on the machine learning model. In some implementations, generating the confidence score for each of the video segments is based on applying a mixture of experts model of machine learning.

In some implementations, a method includes receiving a video that includes multiple frames. The method further includes identifying a start time and an end time of an action in the video based on application of an audio classifier, an RGB classifier, and a motion classifier. The method further includes identifying a video segment from the video that includes frames between the start time and the end time for the action in the video. The method further includes generating a confidence score for the video segment based on a probability that a corresponding action corresponds to one or more of a set of predetermined actions. The method further includes generating a video clip of the video that includes the video segment.

In some implementations, the method further includes generating graphical data to display a user interface that includes the video clip in association with the video. In some implementations, the method further includes identifying a type of action and, upon receiving content from a user, an identity of the user in the video segment and generating a video clip that includes the video segment with an identification of the type of action and the identity of the user. In some implementations, the set of predetermined actions is associated with a live video and the video clip is a summary of the action that occurred during the live video. In some implementations, the method further includes receiving a search request from a user for videos that include a particular action, determining that the particular action matches the action in the video, and providing the user with the video clip. In some implementations, generating the confidence score for each of the video segments is based on applying a mixture of experts model of machine learning.

Other aspects may include corresponding methods, systems, apparatus, and computer program products.

The system and methods described below advantageously identify video segments that include actions in them. The video segments may be combined to create a video clip with actions in it or a video that identifies the location of action in the video. In this way, a user may view actions in videos without having to view the entire video.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
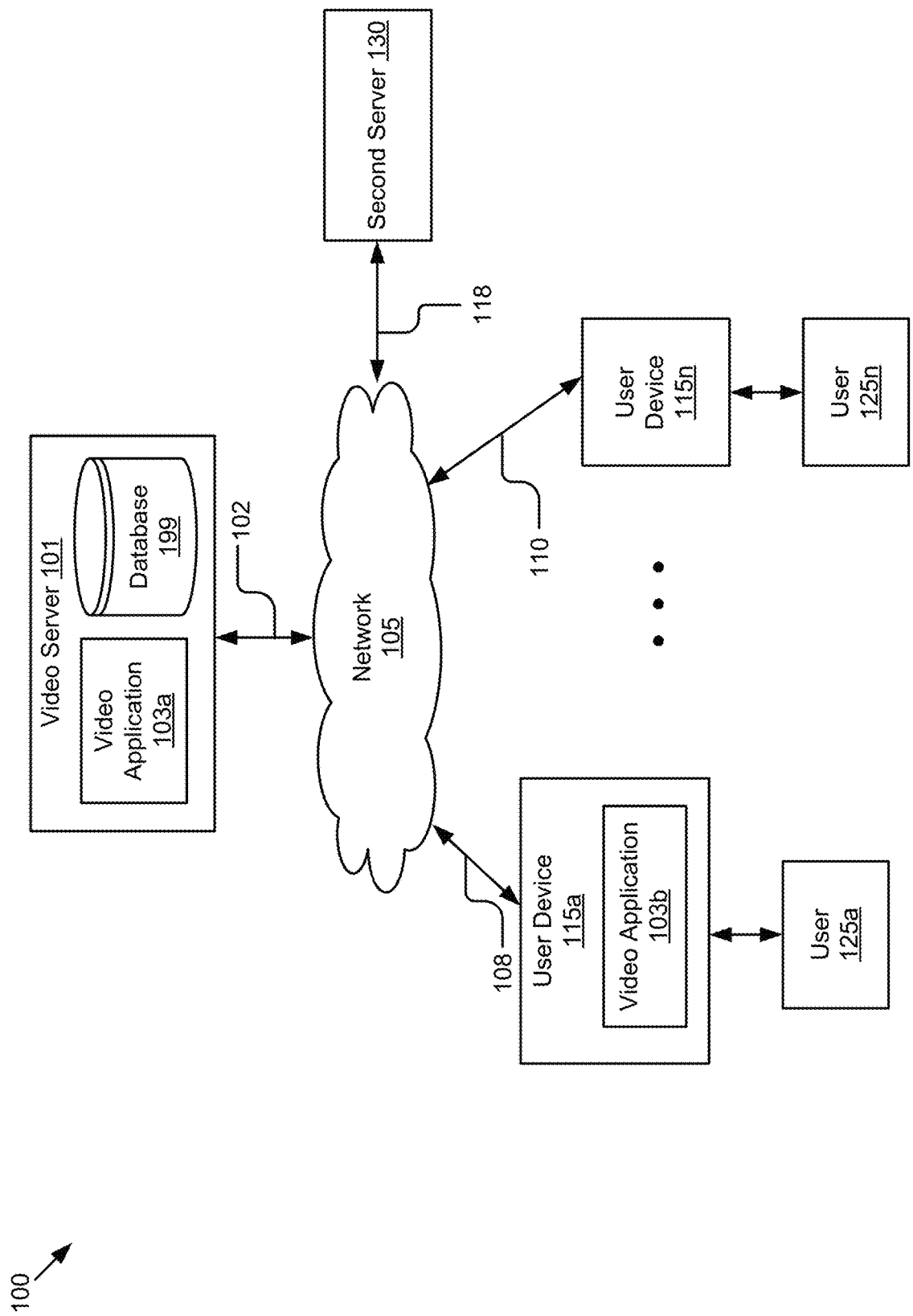
FIG. 1 illustrates a block diagram of an example system that identifies video segments that include action in accordance with some implementations.

Users may be more interested in a part of a video that includes an action than in the full video. In addition, users may be more interested in certain types of actions in different videos. For example, a user may be interested in a video of a soccer match where a player performs actions that lead to scoring, such as kicking or heading the soccer ball into the goal. In another example, a user may be interested in a summary of a live video that identifies video segments where a person is laughing or crying. Users who join a live video stream when the stream is already underway may find it useful to review a summary of the live video that depicts highlights from portions of the live video that occurred prior to the users joining.

In some implementations, a video application receives a video that includes multiple frames. An audio classifier may be used to identify audio associated with actions in the video. An RGB classifier may be used to extract features from multiple frames of the video. A motion classifier may be used to identify motions in the video that correspond to actions. A start time and an end time of each action may be identified based on application of the audio classifier, RGB classifier, and/or the motion classifier. For example, the audio classifier may identify noises associated with a person jumping into a swimming pool; the RGB classifier may identify the swimming pool, water, and people; and the motion classifier may identify motion associated with the person jumping into the pool.

The video application may identify video segments from the video that include frames between the start time and the end time for each action in the video. A confidence score may be generated for each of the video segments based on a probability that a corresponding action in each of the video segments corresponds to one or more of a set of predetermined actions. For example, the confidence score may reflect the probability that the audio classifier, the RGB classifier, and/or the motion classifier identified a video segment of a person jumping into the swimming pool, where jumping into the swimming pool is one of the actions in the set of predetermined actions. The confidence score may be a combination of discrete scores generated by the RGB classifier, the audio classifier, and/or the motion classifier. In some embodiments, the video application uses machine learning to generate the confidence score based on a mixture of experts model.

A subset of the video segments may be selected based on the confidence scores for each of the video segments. The subset of the video segments may include video segments with corresponding confidence scores that exceed a threshold confidence score value. For example, the subset may include video segments from a pool party that include people jumping into the swimming pool, people eating, and people throwing a ball around in the pool. The video application may generate a video clip that includes the subset of the video segments. In another example, the video application may generate graphical data for displaying a user interface that shows time locations within the video where the actions from the subset of the video segments occurred.

Example System

FIG. 1 illustrates a block diagram of an example system 100 that identifies video segments. The illustrated system 100 includes a video server 101, user devices 115a, 115n, a second server 130, and a network 105. Users 125a, 125n may be associated with respective user devices 115a, 115n. In some implementations, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

The video server 101 may include a processor, a memory, and network communication capabilities. In some implementations, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some implementations, the video server 101 sends and receives data to and from one or more of the user devices 115a, 115n and the second server 130 via the network 105. The video server 101 may include a video application 103a and a database 199.

The video application 103a may include code and routines operable to identify video segments that include action. In some implementations, the video application 103a may be implemented using hardware including a field-programmable gate array (FPGA) or an application-specific integrated circuit (ASIC). In some implementations, the video application 103a may be implemented using a combination of hardware and software.

The database 199 may store videos created by users 125 associated with user devices 115 and video clips generated from the videos. In some implementations, the database 199 may store videos that were generated independent of the user devices 115. The database 199 may also store start times, end times, action types, sets of predetermined actions that depend on a type of video, threshold confidence score values, threshold segment score values, etc. The database 199 may also store social network data associated with users 125, information received from the second server 130, user preferences for the users 125, etc.

The user device 115 may be a computing device that includes a memory and a hardware processor, for example, a camera, a laptop computer, a desktop computer, a tablet computer, a mobile telephone, a wearable device, a head-mounted display, a mobile email device, a portable game player, a portable music player, a reader device, a television with one or more processors embedded therein or coupled thereto, or another electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a mobile device that is included in a wearable device worn by the user 125. For example, the user device 115 is included as part of a clip (e.g., a wristband), part of jewelry, or part of a pair of glasses. In another example, the user device 115 can be a smart watch. The user 125 may view images from the video application 103 on a display of the device worn by the user 125. For example, the user 125 may view the images on a display of a smart watch or a smart wristband.

In some implementations, a video application 103b may be stored on a user device 115a. The video application 103 may include a thin-client video application 103b stored on the user device 115a and a video application 103a that is stored on the video server 101. For example, the video application 103b stored on the user device 115a may record video that is transmitted to the video application 103a stored on the video server 101 where a video clip is generated from the video. The video application 103a may transmit the video clip to the video application 103b for display on the user device 115a. The video application 103a stored on the video server 101 may include the same components or different components as the video application 103b stored on the user device 115a.

In some implementations, the video application 103 may be a standalone application stored on the video server 101. A user 125a may access the video application 103 via a web pages using a browser or via other software on the user device 115a. For example, the user 125a may upload a video stored on the user device 115a or from another source, such as from the second server 130, to the video application 103, which generates a video clip.

The second server 130 may include a processor, a memory, and network communication capabilities. In some implementations, the second server 130 is a hardware server. The second server 130 is communicatively coupled to the network 105 via signal line 118. Signal line 118 may be a wired connection, such as Ethernet, coaxial cable, fiber-optic cable, etc., or a wireless connection, such as Wi-Fi®, Bluetooth®, or other wireless technology. In some implementations, the second server 130 sends and receives data to and from one or more of the video server 101 and the user devices 115a-115n via the network 105.

The second server 130 may provide data to the video application 103. For example, the second server 130 may be a separate server that generates videos that are used by the video application 103 to identify video segments that include action. In another example, the second server 130 may be a social network server that maintains a social network where videos may be shared by a user 125 with other users of the social network. In yet another example, the second server 130 may include video processing software that analyzes videos to identify objects, faces, events, a type of action, text, etc. In yet another example, the second server 130 may be a messaging server that maintains a messaging application where videos may be shared by users. The second server 130 may be associated with the same company that maintains the video server 101 or with a different company.

As long as a user consents to the use of such data, the second server 130 may provide the video application 103 with profile information or profile images of a user that the video application 103 may use to match a person in an image with a corresponding social network profile. In another example, if the user consents to the use of such data, the second server 130 may provide the video application 103 with information related to entities identified in the images used by the video application 103. For example, the second server 130 may include an electronic encyclopedia that provides information about landmarks identified in the images, an electronic shopping website that provides information for purchasing entities identified in the images, an electronic calendar application that provides, an event name associated with a video, a map application that provides information about a location associated with a video, etc.

In situations in which the systems and methods discussed herein may collect or use personal information about users (e.g., user data, information about a user's social network, user's location, user's biometric information, user's activities and demographic information), users are provided with opportunities to control whether information is collected, whether the personal information is stored, whether the personal information is used, and how the information about the user is collected, stored, and used. That is, the systems and methods discussed herein collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity information may be treated, e.g., anonymized, so that no personalty, identifiable information can be determined. As another example, a user's geographic location may be generalized to a larger region so that the user's particular location cannot be determined.

Example Computing Device

Figure 2:
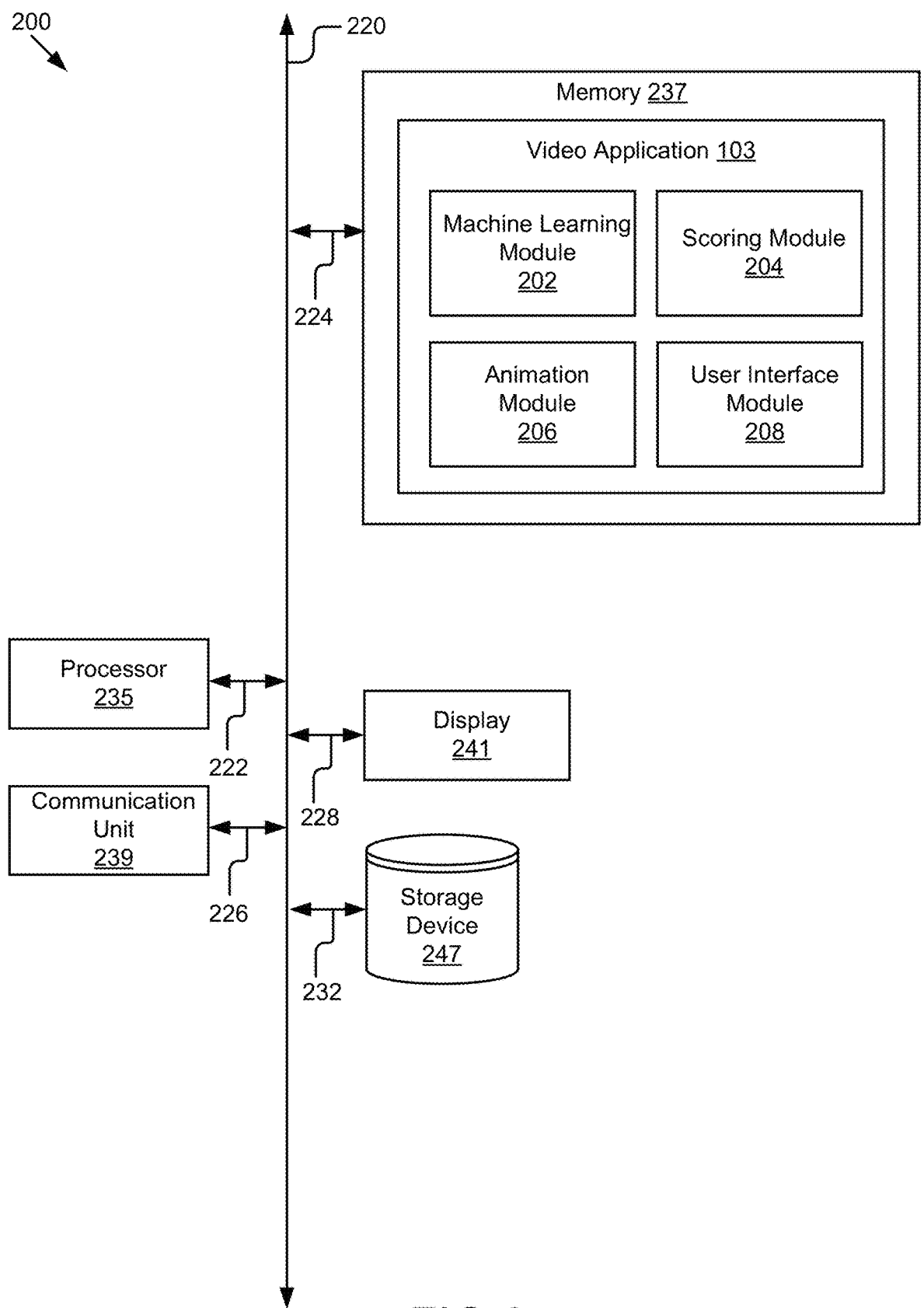
FIG. 2 illustrates a block diagram of an example computing device that identifies video segments that include action in accordance with some implementations.

FIG. 2 illustrates a block diagram of an example computing device 200 that identifies video segments that include action. The computing device 200 may be a video server 101 or a user device 115. The computing device 200 may include a processor 235, a memory 237, a communication unit 239, a display 241, and a storage device 247. A video application 103 may be stored in the memory 237. The components of the computing device 200 may be communicatively coupled by a bus 220.

The processor 235 includes an arithmetic logic unit, a single-core or multicore microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The communication unit 239 transmits and receives data to and from at least one of the user device 115, the video server 101, and the second server 130 depending upon where the video application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the video server 101, depending on where the video application 103 may be stored. In some implementations, the communication unit 239 includes a wireless transceiver for exchanging data with the user device 115, video server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the video application 103. For example, the display 241 may render graphics to display a video clip. The display 241 is coupled to the bus 220 for communication with the other components via signal line 228. Other hardware components that provide information to a user may be included as part of the computing device 200. In some implementations, such as where the computing device 200 is a video server 101, the display 241 may be optional. In some implementations, the computing device 200 may not include all the components. In implementations where the computing device 200 is a wearable device, the computing device 200 may not include storage device 247. In some implementations, the computing device 200 may include other components not listed here, such as one or more cameras, sensors, a battery, etc.

The storage device 247 may be a non-transitory computer-readable storage medium that stores data that provides the functionality described herein. In implementations where the computing device 200 is the video server 101, the storage device 247 may include the database 199 in FIG. 1. The storage device 247 may be a DRAM device, a SRAM device, flash memory or some other memory device. In some implementations, the storage device 247 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 232.

In the illustrated implementation shown in FIG. 2, the video application 103 includes a machine learning module 202, a scoring module 204, an animation module 206, and a user interface module 208. Other modules and/or configurations are possible.

The machine learning module 202 may be operable to identify an action in a video. In some implementations, the machine learning module 202 may include a set of instructions executable by the processor 235 to identify an action in a video. In some implementations, the machine learning module 202 may be stored in the memory 237 of the computing device 200 and can be accessible and executable by the processor 235.

The machine learning module 202 may implement machine learning that can generate and/or enhance classifiers for identifying an action in a video. In some implementations, machine learning can be implemented in one or more components of the video application 103. Trained models may be trained using synthetic data, e.g., data that is automatically generated by a computer, with no use of user information.

In some implementations, trained models may be trained, e.g., based on training data, for which permissions to utilize user data for training have been obtained expressly from users. The training data may include any data, such as videos and corresponding metadata, that is permitted for use for training, such as synthetic or computer-generated data, data licensed for use for training, etc. The training data may include videos that include an identified action. For example, the training data may be derived from top-scoring videos that were classified as including "jumping into pool" because, for example, the videos were tagged with the action "jumping into pool." The videos may come from videos generated internally, such as those stored on the database 199 of the video server 101 or from videos received from the second server 130. For example, the second server 130 may be another video server that provides videos with metadata that describes actions in the videos. In some implementations, the second server 130 may include short videos, such as videos that are five or fewer seconds, and that include a particular action.

In some implementations, a trained model may be obtained based on supervised learning, for example, based on training data including videos and corresponding metadata. For example, a trained model may include model form or structure (e.g., descriptive of a number and organization of a plurality of nodes into layers of a neural network, with associated weights). In some implementations, a trained model may be trained such that the machine learning module 202 applies the trained model to identify a start time and an end time for an action in a video.

In some implementations, users help create the training data by providing user input. Users may be asked to identify a start time and an end time of the action. Continuing with the example above, users may be asked to identify the start time and the end time for any instance in the videos of people jumping into a pool or mark a video has including no action if there is no action. In some implementations, the user may also be asked to identify videos that are low quality because it may be more difficult to identify a start time and an end time in videos where it is difficult to view the actions due to the low quality of the video. As a result of user input, the training data may have accurate identification of the start time and end time for actions.

Based on the training data, the machine learning module 202 may generate a trained model that can determine the start time and the end time of actions in videos. The trained model may be a temporal action localization model. In various implementations, the machine learning module 202 may use Bayesian classifiers, support vector machines, neural networks, or other learning techniques to generate the trained model.

In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, a trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a non-linear function. In various implementations, such computation may include operations such as matrix multiplication. In some implementations, computations by the plurality of nodes may be performed in parallel, e.g., using multiple processors cores of a multicore processor, using individual processing units of a general processing unit or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, a trained model may include embeddings or weights for individual nodes. For example, a trained model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The trained model may then be trained, e.g., using data, to produce a result.

The machine learning module 202 may provide several technical advantages. For example, when the trained model is generated based on unsupervised learning, the trained model can be applied to produce knowledge representations (e.g., numeric representations) from input data. In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output. In some implementations, knowledge representations generated by the machine learning module 202 may be provided to a different device that conducts further processing, e.g., over a network. In such implementations, providing the knowledge representations may provide a technical benefit, e.g., enable faster data transmission with reduced cost.

In some implementations, the machine learning module 202 may be implemented in an offline manner. In these implementations, a trained model may be generated in a first stage. In some implementations, the machine learning module 202 may be implemented in an online manner. For example, in such implementations, an application that includes the machine learning module 202 may utilize an inference produced by the machine learning module 202, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update the trained model, e.g., to update embeddings for the trained model.

In some implementations, the machine learning module 202 may be implemented in a manner that can adapt to particular configuration of device 200 on which the machine learning module 202 is executed. For example, the machine learning module 202 may determine a computational graph that utilizes available computational resources, e.g., the processor 235. For example, if the machine learning module 202 is implemented as a distributed application on multiple devices, the machine learning module 202 may determine computations to be carried out on individual devices in a manner that optimizes computation. In another example, the machine learning module 202 may determine that the processor 235 includes a GPU with a particular number of GPU cores (e.g., 1000) and implement the inference engine accordingly (e.g., as 1000 individual processes or threads).

In some implementations, the machine learning module 202 may implement an ensemble of trained models. For example, the trained model may include a plurality of trained models that are each applicable to same input data. In these implementations, the machine learning module 202 may choose a particular trained model, e.g., based on available computational resources, success rate with prior inferences, etc. In some implementations, the machine learning module 202 may apply a plurality of trained models. In these implementations, the machine learning module 202 may combine outputs from applying individual models, e.g., using a voting-technique that scores individual outputs from applying each trained model, or by choosing one or more particular outputs. Further, in these implementations, the machine learning module 202 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine learning module 202.

In some implementations, the machine learning module 202 uses the sample set to train classifiers to automatically identify the start time and the end time of actions in videos. The machine learning module 202 may also use the classifiers to identify a type of action in a video. In some implementations, the machine learning module 202 generates three types of classifiers: an audio classifier, a red green blue (RGB) classifier, and a motion classifier. The audio classifier and the RGB classifier may determine an understanding of the scene context and the motion classifier may determine motion (or motion patterns) within the video, thereby localizing the action within particular frames. In some implementations, each of the classifiers may be trained separately to recognize specific actions, and the results may be combined, for example, using a mixture of experts model. In some implementations, the classifiers may be trained jointly.

The audio classifier may use frame-level audio to identify locations in a video where the audio corresponds to action and a type of action that is associated with the audio. For example, the video may be a soccer game, the action may be a player scoring a goal, and the audio may be the crowd cheering and/or booing. In another example, the video may be a live video, the action may be a person crying, and the audio may be sobbing, a shaky voice, and/or sniffling.

The RGB classifier may extract features from multiple frames of a video and convert pixels from the multiple frames of the video into a feature vector. The feature vector may be usable, for example, by clustering techniques, to identify features that form a pattern associated with an action and the type of action. For example, for the video of the soccer game, the RGB classifier may detect one or more of a soccer player, a soccer ball, a soccer net, and a goalkeeper within the multiple frames. The RGB classifier may identify these frames as being associated with the action of kicking a soccer ball into the soccer net because the features, i.e., the soccer player, the soccer ball, the soccer net, and the goalkeeper, are associated with that action. Continuing with the example of a live video, the features may be a person with a particular expression (e.g., a scrunched-up face) or a particular position (e.g., shoulders slumped and head looking down) where the action is crying because the expression and the position are associated with someone who is beginning to cry. Alternatively, the features may be a person with an upturned face, crinkles around the eyes, and an open mouth where the action is laughing because the expression and the position are associated with someone who is beginning to laugh.

The motion classifier may identify an optical flow in the video that is associated with particular types of movement. For example, in the video of the soccer game, the motion classifier may identify the motion of the soccer player moving to kick the ball into the soccer net. In the live video example, the motion classifier may identify the motion of the person opening her mouth, closing her eyes, and letting tears escape her eyes as being associated with the optical flow of a person that is crying. In another example, the motion classifier may identify the motion of the person opening her mouth, crinkling her eyes, and shaking as being associated with the optical flow of a person that is laughing.

The machine learning module 202 receives a video that includes multiple frames. The machine learning module 202 identifies a start time and an end time of each action in the video based on application of one or more of an audio classifier, an RGB classifier, and a motion classifier. The machine learning module 202 may use a sliding window localizer to analyze the features within a series of frames and apply the audio classifier, the RGB classifier, and/or the motion classifier to the series of frames. The sliding window may include frames that span 3-5 seconds of the video. The machine learning module 202 may slide (e.g., advance) the window across the video in increments, such as one second increments. The machine learning module 202 may use the audio classifier, the RGB classifier, and/or the motion classifier to score the features within the sliding window and select the top K scoring actions per window where K may be a default number or a number that is determined by the machine learning module 202. In some implementations, the machine learning module 202 determines whether action is occurring in a window by comparing the feature vector for that window with an action feature vector. When the feature vector matches, the window is identified as depicting an action. If actions take place during seconds 2-5, segments that cover seconds 0-4, 1-5, 2-6, etc. will likely all match the action; in this case, 1-5 or 2-6 would be selected.

In some implementations, only a subset of the classifiers may be used because a video may be lacking sufficient data. For example, the video may be of a child blowing out a birthday candle, but the video may lack sound. In another example, a video may have too poor a quality for the RGB classifier to work. In these situations, the machine learning module 202 may apply a subset of the classifiers to generate a feature vector. In this example, the machine learning module 202 may use the RGB classifier and the motion classifier, but not the audio classifier.

The machine learning module 202 may identify one or more video segments from the video that include frames between the start time and the end time for each action in the video. Each video includes a single action or multiple actions. For example, a ten second video of a child blowing out a birthday cake may have only one action. Alternatively, an hour-long tennis match may have hundreds of actions where the movement of the tennis ball between two players is divided into discrete actions. As a result, the machine learning module 202 identifies the one or more video segments based on the number of actions in the video.

In some implementations, the machine learning module 202 performs object recognition to identify objects in the video segments. Upon user consent, the machine learning module 202 may perform object recognition that includes identifying a face in the video segments and determining an identity of the face. The machine learning module 202 may compare an image frame of the face to publicly available images of people, compare the image frame to other members that use the video application 103, subject to the consent of the other members. In some implementations, upon user consent, the machine learning module 202 may request identifying information from the second server 130. For example, the second server 130 may maintain a social network and the machine learning module 202 may request profile images or other images of social network users that are connected to the user associated with the video. In some implementations, upon user consent, the machine learning module 202 may employ facial recognition techniques to people in image frames of the video segments to identify people associated with the faces.

The machine learning module 202 may identify objects and, if the user has provided consent, people in the video segment. The machine learning module 202 may generate metadata that is associated with the video segment that includes the identification. For example, for a video segment of the user's daughter blowing out a birthday cake, the machine learning module 202 may generate metadata that, upon user consent, includes the daughter's name, names of other people in the video segment, and identification of the birthday cake.

The scoring module 204 may be operable to score video segments. In some implementations, the machine learning module 202 may include a set of instructions executable by the processor 235 to score the video segments. In some implementations, the machine learning module 202 may be stored in the memory 237 of the computing device 200 and can be accessible and executable by the processor 235.

The scoring module 204 may identify a type of action performed in a video segment. Although the scoring module 204 may be able to identify various actions that are performed in a video, users may not want to view all the actions. For example, users may not be interested in video clips that include a person scratching their nose. As a result, user interest may be determined based on aggregated data from consenting users that view videos. For example, it may be determined that for videos that depict soccer matches, a majority of users view portions of videos that depict a goal being scored, and accordingly, the action "scoring a goal in a soccer match" may be identified as of interest to users. In some examples, user interest may be determined based on a comparison of summary versions of a video with a corresponding entire video. For example, a highlight reel from a birthday celebration may have a corresponding summary version that depicts the actions of "blowing out candles," "cutting the cake," "confetti falling," etc. Accordingly, these actions may be determined as of interest to users. The scoring module 204 may compare an action in a video segment to a set of predetermined actions that are identified as described above. For example, the set of predetermined actions may include actions such as a person throwing a baseball, a person kicking a stationary soccer ball, a child sliding down a slide, a dog yawning, and a person jumping into a pool.

The scoring module 204 may generate a confidence score for a video segment that is based on a probability that an action in the video segment corresponds to one or more actions in the set of predetermined actions. In some implementations, the confidence score is between 0 and 1 and corresponds to a probability where 0 represents 0% confidence that the action matches a predetermined action and 1 represents 1% confidence that the action matches a predetermined action. This may be used to advantageously exclude uninteresting actions from being identified.

In some implementations, the scoring module 204 uses a mixture of experts model to score the probability that an action occurred in the video segment. The mixture of experts model is a trained model that recognizes when certain patterns correspond to particular actions using different discrete models. In some implementations, the mixture of experts model uses discrete scores from each of the classifiers (or each of the classifiers that were used for the video segment) to generate a confidence score. For example, the mixture of experts model may use discrete scores generated by the audio classifier, the RGB classifier, and the motion classifier to generate the confidence score.

In some embodiments, the scoring module 204 identifies a type of video and compares action in a video segment to a set of predetermined actions that correspond to the type of video. This is advantageous because the predetermined actions for a sports video that are deemed interesting may be different from the predetermined actions for a family video that are deemed interesting. In the sports video, users may not be interested in a video segment of a dog yawning because the focus of the video is the actions of the players. But in a family video, the dog may be part of the family and a video segment of the dog yawning may be interesting. In another example, the set of predetermined actions for home monitoring that would be interesting would include a pet jumping on furniture, a person entering through a window, a person taking certain objects from a house (e.g., a laptop, a television, a set of car keys, etc.).

An action may include multiple types of movements that could be categorized differently. As a result, in some implementations, the scoring module 204 generates multiple confidence scores for a video segment where each confidence score corresponds to a different type of action. For example, the set of predetermined actions may include a first confidence score that a dog performed a jump and a second confidence score that the dog shook water off because the dog jumped while shaking off water.

A video may include multiple video segments where the type of action is the same. For example, a video of a soccer game may have multiple instances where a player kicked the ball. The scoring module 204 may assign different confidence scores to each of the segments based on the different signatures generated based on each of the classifiers. For example, a first video segment may have a player kicking a ball where part of the player's foot is obscured by another player. The motion classifier for the first video segment may indicate that the motion was not completely clear due to the obstruction. As a result, the first video segment may have a confidence score that indicates less confidence that the player kicked the soccer ball versus a second video segment where the player's foot was in full-view.

In some implementations, the scoring module 204 assigns a segment score to a video segment based on personalization information. For example, when the user consents to the use of user data, the scoring module 204 may assign a segment score to a segment based on personalization information for a user associated with the video. For example, the scoring module 204 maintains a user profile for a user that includes a list of positive objects that the user associated with the video has identified as being positive. The scoring module 204 may determine personalization information, subject to user consent, based on explicit information provided by the user, implicit information based on the user's reactions to videos, such as comments provided on video websites, activity in social network applications, etc. In some implementations, the scoring module 204 determines user preferences based on the types of videos associated with the user. For example, the scoring module 204 may determine that the user prefers video segments from a pool party that include activities in the pool and not activities that include cooking food on a grill.

The segment score may be further based on identifying a relationship between the user that views the video segment and an identification of people in the video segment. For example, upon user consent, when the scoring module 204 may identify that the user has a relationship with certain people in a video segment in a social network (e.g., friendship, a direct connection, a work association, etc.), the scoring module 204 assigns a segment score to the video segment that indicates that the video segment is more interesting to the user than a video segment without people that are related to the user.

The animation module 206 may be operable to generate a video clip from a subset of video segments. In some implementations, the animation module 206 can be a set of instructions executable by the processor 235 to provide the functionality described below for generating the video clip. In some implementations, the animation module 206 can be stored in the memory 237 of the computing device 200 and can be accessible and executable by the processor 235.

In some implementations, the animation module 206 receives selected video segments from the machine learning module 202 or the scoring module 204. In some implementations, the animation module 206 may retrieve the selected video segments from the storage device 247.

The animation module 206 may select a subset of the video segments that are associated with confidence scores that exceed a confidence score threshold or a combination of confidence scores and segment scores that exceed a threshold animation score. The animation module 206 may compare the confidence scores for the video segments to a threshold confidence score value and select the subset of the video segments with corresponding confidence scores that exceed the confidence score value. Alternatively, the animation module 206 may select a top number of video segments with the highest confidence scores if highest corresponds to a closer match or the top number of video segments with the lowest confidence scores if lowest corresponds to the closer match. In some implementations, the animation module 206 selects the subset of video segments based on the confidence score and the type of action included in each of the video segments.

In some implementations, the animation module 206 selects the subset of video segments based on the confidence scores and segment scores. The animation module 206 may determine whether a combination of the confidence score and the segment score for each of the video segments exceeds a threshold animation score. The combination of the confidence score and the segment score may be a summation of the confidence score and the segment score. Video segments with the combination that exceed the threshold animation score may be selected for the animation module 206 to generate one or more video clips. Video segments that fail to exceed the threshold animation score may be skipped.

In some implementations, the animation module 206 selects the subset of video segments based on a type of action in the video segments. For example, the animation module 206 generates a video clip with a theme, such as all the video segments from a movie where people run up flights of stairs. In another example, the animation module 206 generates a highlights reel of all the video segments from a basketball game where a particular player scored. In another example, the animation module 206 selects the subset of video segments based on the best actions in a sports game where the best actions are defined by a noise level of the crowd that corresponds to each action. In yet another example, the animation module 206 generates a concept movie of the video segments that include a particular concept.

In some implementations where the video includes more than one action for a particular type of action, the animation module 206 selects a particular video segment of the video segments that correspond to the more than one action. The animation module 206 may select the particular video segment based on the confidence score for the video segment being greater than confidence scores for other video segments that correspond to the more than one actions. For example, the animation module 206 may select a particular video segment of a football player scoring a touchdown over other video segments of a football player scoring a touchdown because the particular video segment is associated with a higher confidence score based on the motion because clear to view, the sound of the crowd being particularly enthusiastic, etc.

In some implementations, the animation module 206 selects the subset of videos based on a timestamp associated with each video segment. The animation module 206 may select the subset based on several actions that may be combined to represent a bigger action. For example, the animation module 206 selects the subset to include a first video clip of a person choosing firecrackers, a second video clip of the person positioning the firecrackers, and a third video clip of the firecrackers going off.

In some implementations, the animation module 206 adds audio to a video clip. The audio may include music that is based on a type of video. For example, the music for a sports video clip may have a fast tempo and an upbeat tone, the music for a birthday party may be happy music, etc. The audio may include audio effects that correspond to actions. For example, the audio effect may include a splashing sound that corresponds to a video clip of people jumping into a swimming pool.

In some implementations, the animation module 206 may receive feedback from a user and modify the video clip criteria and/or the technique for generating the confidence score and/or the segment score accordingly. For example, if a user provides an indication of approval (e.g., a thumbs up, a +1, a like, saving a video clip to the user's gallery, etc.) of a video clip that includes the user's dog, the animation module 206 may include the user's dog in a list of positive objects. In another example, the user may explicitly state that the user enjoys video clips where the event type is a rock show. The animation module 206 may update personalization information associated with the user, such as a user profile, to include the rock show as a preferred event type. In some implementation, the feedback includes an indication of disapproval (a thumbs down, a −1, a dislike, etc.). In some implementations, the indications of approval and/or disapproval are determined based on comments provided by a user. In some implementations, the feedback includes an identification of a person, an object, or a type of event that the user wants to be included in the video clip. In some implementations, the feedback may include a preference for types of video clips. For example, the user may provide a preference to view video clips of a soccer game with certain players.

The animation module 206 may generate a video clip of the subset of the video segments, where the video clip is displayed in association with the video. For example, the video clip may be played before the video. In another example, the video may be displayed for playing and an icon may be displayed in association with the video that, when selected, plays the video clip. The animation module 206 instructs the user interface module 208 to generate graphical data for displaying a user interface that includes the video clip.

Figure 3A:
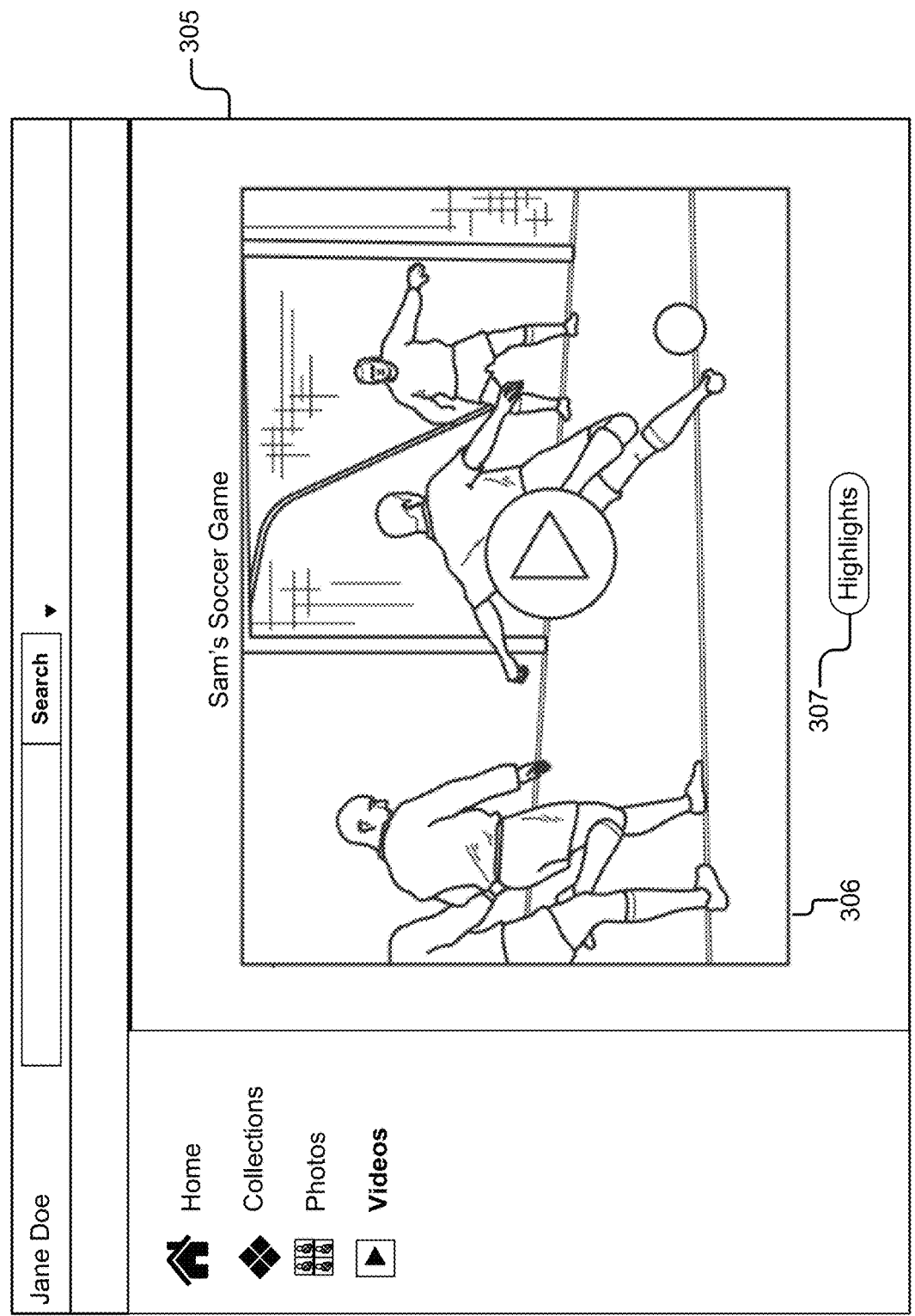
FIG. 3A illustrates a graphic representation of an example user interface that includes a preview of a video with an option to view highlights or the full video in accordance with some implementations.

Turning to FIG. 3A, a graphic representation 300 is illustrated of an example user interface that includes a preview of a video with an option to view highlights or the full video in accordance with some implementations. The video page 305 includes a full video 306 of Sam's Soccer Game. The user interface includes an option for switching from the full video 306 to a video clip by selecting the highlights 307 button.

In some embodiments, the animation module 206 instructs the user interface to generate graphical data for displaying a user interface that provides a user with an option to add an automated effect to the video clip. The automated effect includes, for example, different objects that can be added to people or objects in the video clip. The automated effect may also include filters to create a stylized feel. For example, a gritty filter could be applied to a video clip of a sports event, a saturation filter could be applied to a video clip of a child jumping in a ball pit, etc.

In some implementations, the automated effects are based on objects identified by the machine learning module 202. For example, where people are identified in a video clip, the animation module 206 instructs the user interface module 208 to include options for different masks to put on the people in the video clip. In another example, where the machine learning module 202 identifies objects in a video clip, the animation module 206 instructs the user interface module 208 to include options for different automated effects to overlay on the objects, such as fireballs, hammers, etc.

Figure 3B:
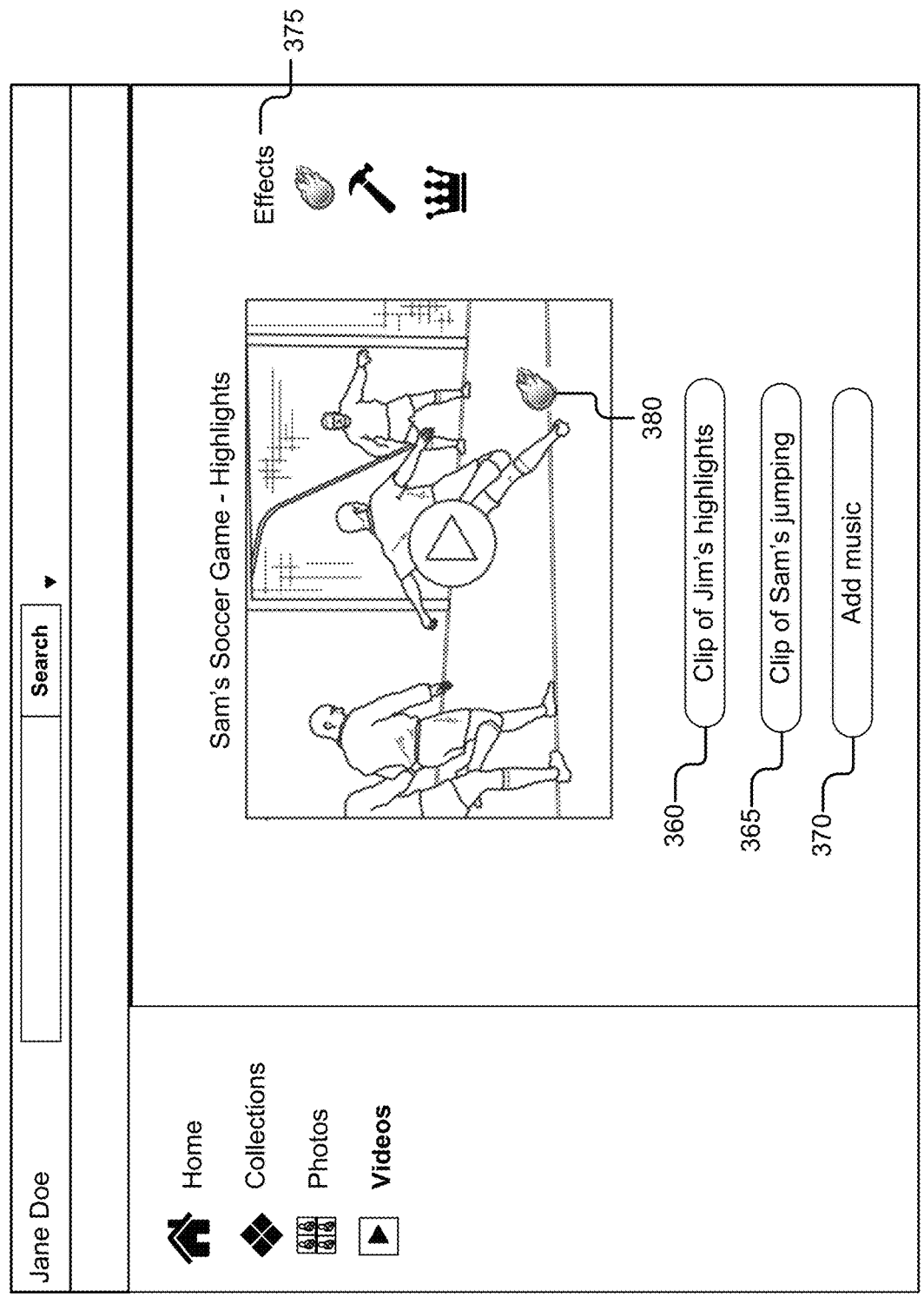
FIG. 3B illustrates a graphic representation of an example user interface where a user selected to view the highlights from the user interface in FIG. 3A in accordance with some implementations.

FIG. 3B illustrates a graphic representation 350 of an example user interface where a user selected to view the highlights from the user interface in FIG. 3A in accordance with some implementations. In this example, the animation module 206 selected video clips that included Sam and actions that corresponded to a set of pre-determined actions. The animation module 206 also instructed the user interface module 208 to provide a user with an option to select a button 360 to cause the animation module 206 to generate a video clip of Jim's highlights, a button 365 to cause the animation module 206 to generate a video clip of Sam's jumping, and a button 370 to cause the animation module 206 to add music to the video clip. If a user selects the button 360 to cause the animation module 206 to generate a video clip of Jim's highlights, the animation module 206 selects a subset of the video segments that include actions with Jim. If a user selects the button 365 to cause the animation module 206 to generate a video clip of Sam's jumping, the animation module 206 selects a subset of the video segments that include actions with Sam jumping. If a user selects button 370 cause the animation module 206 to add music to the video clip, the animation module 206 adds music to the subset of the video segments.

The graphic representation 350 also includes an effects option 375 that includes a list of effects to add to the video clip. In this example, a user already overlaid a fireball 380 over the soccer ball to make it appear as if the soccer player is kicking a fireball into the goal.

Figure 4:
FIG. 4 illustrates a graphic representation of an example user interface that includes a live video and an option to view a summary of the live video in accordance with some implementations.

FIG. 4 illustrates a graphic representation 400 of an example user interface that includes a live video and an option to view a summary of the live video in accordance with some implementations. The live video includes a woman talking for a period of time that is indicated by the time bar 405. The animation module 206 selects a subset of video segments for the types of actions that are associated with a live video. Because live videos usually involve people doing small actions, such as crying, laughing, cooking, etc., the types of actions are different from other videos, such as videos for a football game. As a result, the video segments are compared to a set of predetermined actions that are associated with the live video.

The animation module 206 instructs the user interface module 208 to generate a live summary button 420 that, when selected, causes the user interface to display the subset of video segments. In this way, the subset may include the interesting moments that have occurred in the live summary. This may be particularly advantageous for users that do not want to view an entire live video when the live video may be distilled down to a few interesting moments.

In some implementations, instead of selecting a subset of the video segments, the animation module 206 may instruct the user interface module 208 to identify times within the video that corresponds to video segments. The animation module 206 may also instruct the user interface module 208 to identify a type of action that is performed within the video segment.

Figure 5:
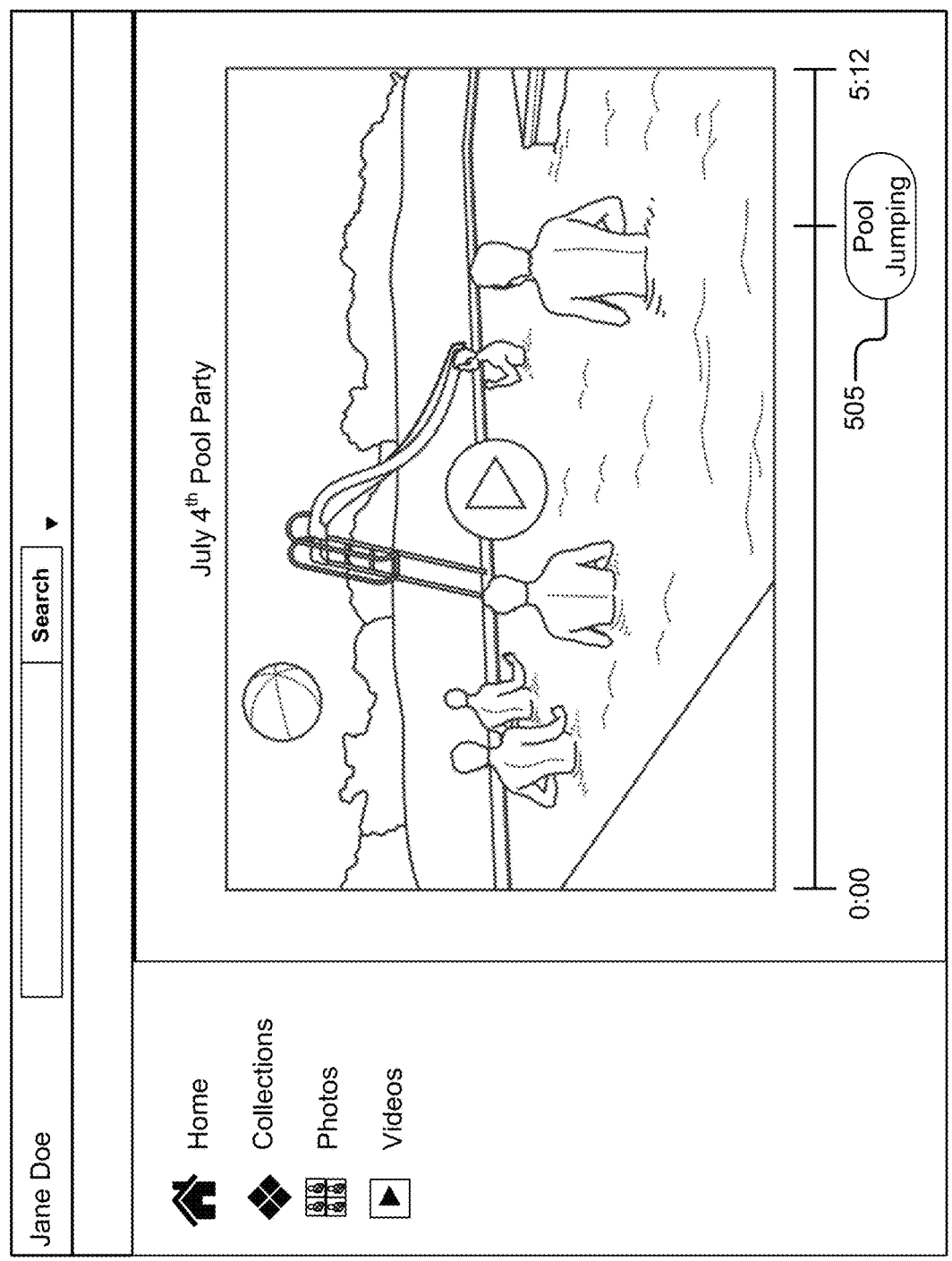
FIG. 5 illustrates a graphic representation of an example user interface that identifies an action in a video in accordance with some implementations.

FIG. 5 illustrates a graphic representation 500 of an example user interface that identifies an action that occurs in a video in accordance with some implementations. The animation module 206 instructs the user interface module 208 to generate graphical data that shows the location within the video where the people jump into the pool. The user interface includes a pool jumping button 505 that, when selected, advances the video to the portion that shows people jumping into the pool.

The user interface module 208 may be operable to generate graphical data for displaying a user interface to a user. In some implementations, the user interface module 208 can be a set of instructions executable by the processor 235 to provide the functionality described below for generating graphical data for displaying the user interface. In some implementations, the user interface module 208 can be stored in the memory 237 of the computing device 200 and can be accessible and executable by the processor 235.

The user interface module 208 may receive instructions from the other modules in the video application 103 to generate graphical data operable to display a user interface. For example, the user interface module 208 may generate a user interface that displays the video clip generated by the animation module 206.

In some implementations, the user interface module 208 may receive video clips from the animation module 206 for video segments where the confidence score or the segment scores associated with video segments exceeded a threshold confidence score value or a threshold segment score value, respectively. The user interface module 208 may generate an animation page that includes the video clips or links to the video clips.

The user interface module 208 may generate graphical data for displaying video clips with a variety of different features. The video clips may automatically play. Alternatively or additionally, the video clips may have to be selected, e.g., by a user, to play. In some implementations, a user may be able to configure automatic playback as a system setting. The user interface module 208 may include different rendering options, such as forward-backward rendering and forward rendering. In some implementations, the rendering options may be determined based on content and/or motion.

The user interface module 208 may generate graphical data to display video clips that include a link to the full video such that, responsive to a user clicking on the video clip, the user interface may display the original video or cause a new webpage to open that includes the full video. In some implementations, the user interface module 208 generates a thumbnail of the video clip that automatically plays the video clip or a shorter version of the video clip.

In some implementations, the user interface module 208 generates graphical data for displaying a search bar where users can search for video clips and/or videos. For example, if a user searches for "trampoline jumping," the user interface module 208 may retrieve video clips that include trampoline jumping. In some implementations, the user interface module 208 may return a list of videos that include trampoline jumping or a link (e.g., a uniform resource locator) to the time location within each of the corresponding videos that includes the trampoline jumping.

Example Methods

Figure 6:
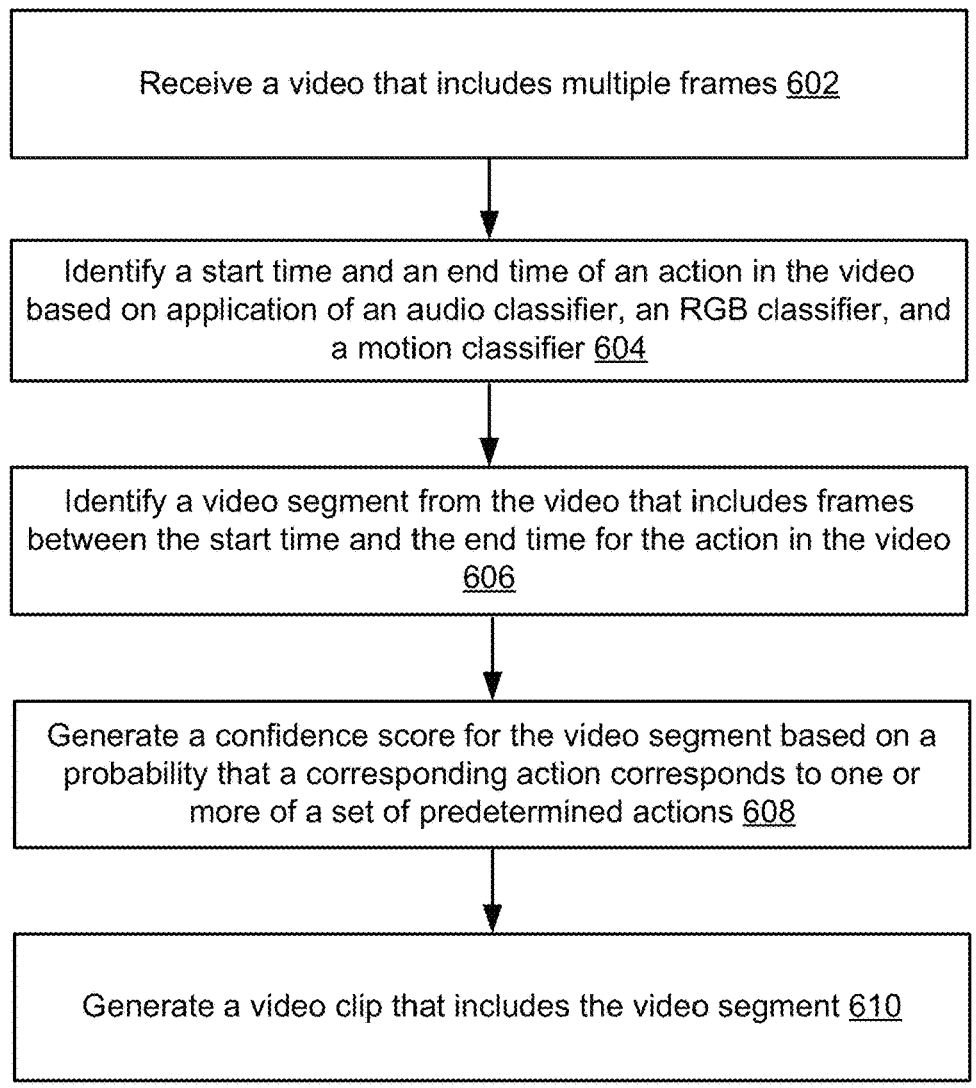
FIG. 6 illustrates a flowchart of an example method to identify a video segment that includes an action in accordance with some implementations.

FIG. 6 illustrates a flowchart of an example method 600 to generate a video clip of an action. In some implementations, the steps in FIG. 6 may be performed by the video application 103 of FIG. 1 and/or FIG. 2.

At block 602, a video is received that includes multiple frames. For example, the video is of a pool party. At block 604, a start time and an end time of an action in the video are identified based on application of an audio classifier, an RGB classifier, and a motion classifier. For example, the start and end time are identified for a person jumping into a swimming pool. At block 606, a video segment is identified from the video that includes frames between the start time and the end time for the action in the video. At block 608, a confidence score for the video segment is generated based on a probability that a corresponding action corresponds to one or more of a set of predetermined actions. For example, a confidence score is generated based on a probability that the video segment of the person jumping into the swimming pool corresponds to the predetermined action "jumping into a swimming pool." At block 610, a video clip is generated that includes the video segment.

Figure 7:
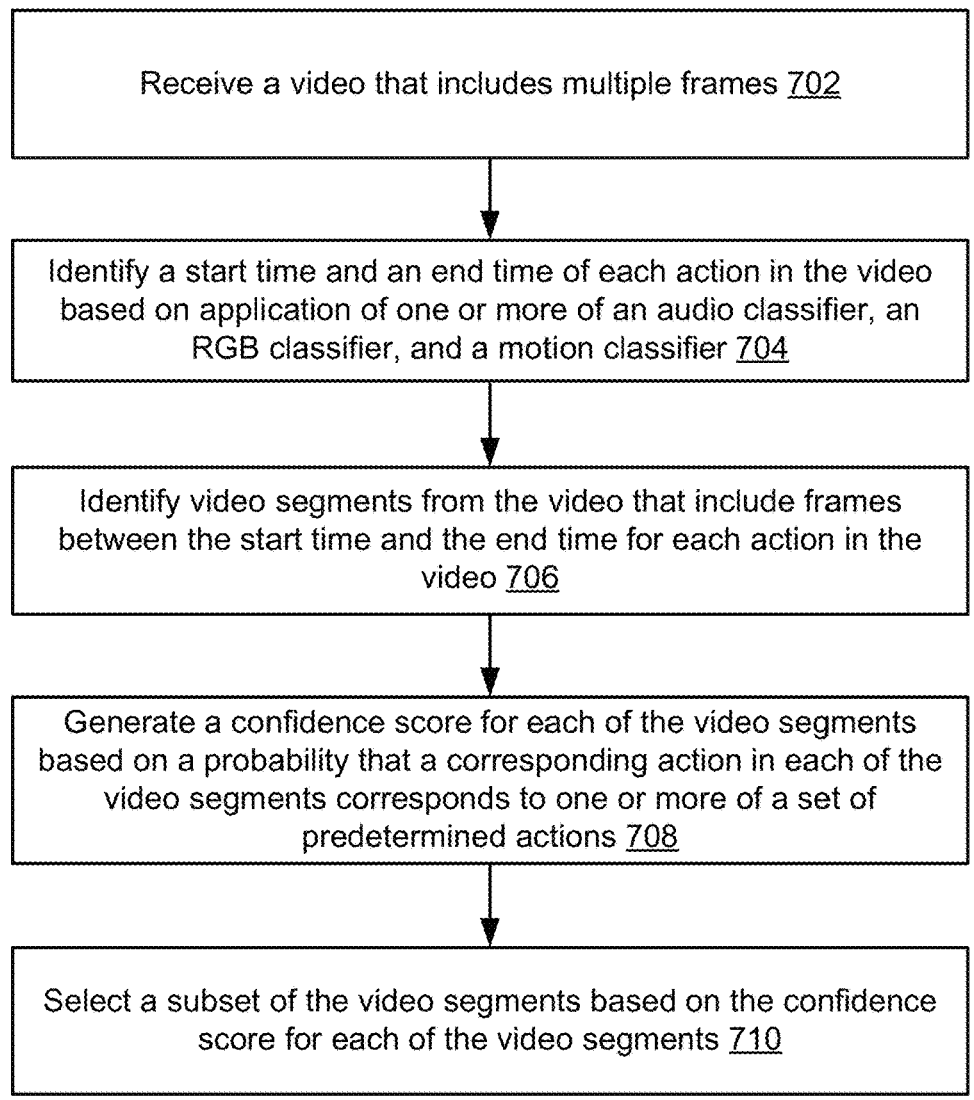
FIG. 7 illustrates a flowchart of an example method to generate a subset of video segments that include actions in accordance with some implementations.

FIG. 7 illustrates a flowchart of an example method 700 to generate a subset of video segments that include actions. In some implementations, the steps in FIG. 7 may be performed by the video application 103 of FIG. 1 and/or FIG. 2.

At block 702, a video is received that includes multiple frames. At block 704, a start time and an end time of each action in the video are identified based on an application of one or more of an audio classifier, an RGB classifier, and a motion classifier. At block 706, video segments are identified from the video that include frames between the start time and the end time for each action in the video. At block 708, a confidence score for each of the video segments is generated based on a probability that a corresponding action in each of the video segments corresponds to one or more of a set of predetermined actions. At block 710, a subset of the video segments are selected based on the confidence score for each of the video segments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A system comprising:
   one or more processors; and
   a memory coupled to the one or more processors, with instructions stored thereon that, when executed by the one or more processors, cause the one or more processors to perform operations comprising:
      receiving a video that includes multiple frames;
      identifying video segments from the video that each include a corresponding action, wherein each video segment of the video segments include two or more contiguous frames of the multiple frames of the video;
      generating a confidence score for each of the video segments based on a probability that the corresponding action in the video segment corresponds to a particular action in a set of predetermined actions; and
      selecting a subset of the video segments based on the confidence score for each of the video segments.

2. The system of claim 1, wherein the operations further comprise:
   generating a user profile for a user that includes a list of types of videos that the user previously indicated a preference for; and
   determining a type for the video, wherein the confidence score is based on the probability that the corresponding action in the video segment corresponds to the type of video in the set of predetermined actions.

3. The system of claim 1, wherein the operations further comprise:
   identifying one or more people in the video segments;
   determining that a user has a relationship with the one or more people in a first video segment; and
   assigning a higher segment score to the first video segment than one or more other video segments that do not depict a person that is related to the user.

4. The system of claim 1, wherein the video is a live video and the set of predetermined actions includes at least one of laughing or crying.

5. The system of claim 1, wherein the operations further include identifying the action in the video based on using an audio classifier that analyzes an audio portion of the video to identify a start time and an end time of the action and to identify a type of action that is associated with audio.

6. The system of claim 1, wherein the operations further include identifying the action in the video based on using an RGB classifier that employs a feature vector and clustering techniques to identify features that form a pattern associated with the action and a type of action.

7. The system of claim 1, wherein the operations further include identifying the action in the video based on using a motion classifier that identifies an optical flow in the video that is associated with particular kinds of movement.

8. The system of claim 1, wherein selecting the subset of the video segments based on the confidence score includes selecting the subset of the video segments that exceed a confidence score threshold and the operations further comprise:
generating a video clip that includes the subset of the video segments.

9. The system of claim 1, wherein the operations further comprise:
generating a segment score to each of the video segments based on personalization information for a user, wherein selecting the subset of the video segments is further based on a combination of the confidence score and the segment score for each of the video segments exceeding a threshold animation score; and
generating a video clip that includes the subset of the video segments.

10. A method comprising:
receiving a video that includes multiple frames;
identifying video segments from the video that each include a corresponding action, wherein each video segment of the video segments include two or more contiguous frames of the multiple frames of the video;
generating a confidence score for each of the video segments based on a probability that the corresponding action in the video segment corresponds to a particular action in a set of predetermined actions; and
selecting a subset of the video segments based on the confidence score for each of the video segments.

11. The method of claim 10, further comprising:
generating a user profile for a user that includes a list of types of videos that the user previously indicated a preference for; and
determining a type for the video, wherein the confidence score is based on the probability that the corresponding action in the video segment corresponds to the type of video in the set of predetermined actions.

12. The method of claim 10, further comprising:
identifying one or more people in the video segments;
determining that a user has a relationship with the one or more people in a first video segment; and
assigning a higher segment score to the first video segment than one or more other video segments that do not depict a person that is related to the user.

13. The method of claim 10, further comprising identifying the action in the video based on using an audio classifier that analyzes an audio portion of the video to identify a start time and an end time of the action and to identify a type of action that is associated with audio.

14. The method of claim 10, further comprising identifying the action in the video based on using an RGB classifier that employs a feature vector and clustering techniques to identify features that form a pattern associated with the action and a type of action.

15. The method of claim 10, further comprising identifying the action in the video based on using a motion classifier that identifies an optical flow in the video that is associated with particular kinds of movement.

16. A non-transitory computer readable medium with instructions that, when executed by one or more computers, cause the one or more computers to perform operations, the operations comprising:
receiving a video that includes multiple frames;
identifying video segments from the video that each include a corresponding action, wherein each video segment of the video segments include two or more contiguous frames of the multiple frames of the video;
generating a confidence score for each of the video segments based on a probability that the corresponding action in the video segment corresponds to a particular action in a set of predetermined actions; and
selecting a subset of the video segments based on the confidence score for each of the video segments.

17. The non-transitory computer readable medium of claim 16, wherein the operations further comprise:
generating a user profile for a user that includes a list of types of videos that the user previously indicated a preference for; and
determining a type for the video, wherein the confidence score is based on the probability that the corresponding action in the video segment corresponds to the type of video in the set of predetermined actions.

18. The non-transitory computer readable medium of claim 16, wherein the operations further comprise:
identifying one or more people in the video segments;
determining that a user has a relationship with the one or more people in a first video segment; and
assigning a higher segment score to the first video segment than one or more other video segments that do not depict a person that is related to the user.

19. The non-transitory computer readable medium of claim 16, wherein the operations further comprise identifying the action in the video based on using an audio classifier that analyzes an audio portion of the video to identify a start time and an end time of the action and to identify a type of action that is associated with audio.

20. The non-transitory computer readable medium of claim 16, wherein the operations further include identifying the action in the video based on using an RGB classifier that employs a feature vector and clustering techniques to identify features that form a pattern associated with the action and a type of action.

* * * * *